United States Patent
Rabe

(10) Patent No.: US 9,982,351 B1
(45) Date of Patent: May 29, 2018

(54) CHEMICAL MECHANICAL POLISHING FOR IMPROVED CONTRAST RESOLUTION

(71) Applicant: GM GLOBAL TECHNOLOGY OPERATIONS LLC, Detroit, MI (US)

(72) Inventor: Adam P. Rabe, Auburn Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/420,237

(22) Filed: Jan. 31, 2017

(51) Int. Cl.
| | |
|---|---|
| B44C 1/22 | (2006.01) |
| C03C 15/00 | (2006.01) |
| C03C 25/68 | (2006.01) |
| C23F 1/00 | (2006.01) |
| C23F 1/36 | (2006.01) |
| C09G 1/02 | (2006.01) |
| C09K 3/14 | (2006.01) |

(52) U.S. Cl.
CPC ............... *C23F 1/36* (2013.01); *C09G 1/02* (2013.01); *C09K 3/1409* (2013.01)

(58) Field of Classification Search
USPC ............................................................ 216/89
See application file for complete search history.

(56) References Cited

U.S. PATENT DOCUMENTS

| | | | |
|---|---|---|---|
| 6,579,439 B1 * | 6/2003 | Chandler | C25F 3/20 205/671 |
| 7,014,531 B2 | 3/2006 | Hansen | |
| 7,967,925 B2 | 6/2011 | Wang | |
| 2014/0260805 A1 | 9/2014 | Wang et al. | |

OTHER PUBLICATIONS

Grinding and Polishing—Knowledge. Struers.com. (2017). Struers. com. Retrieved Jan. 23, 2017, from http://www.struers.com
Metallographic preparation of aluminium and aluminium alloys—Application Notes. (2017). Struers.com. Retrieved Jan. 23, 2017, from http://www.struers.com.

* cited by examiner

*Primary Examiner* — Roberts Culbert

(57) ABSTRACT

An aluminum alloy article having improved surface contrast and an associated method are provided. The method includes grinding a surface of the article, diamond polishing the surface of the article, and removing α-aluminum matrix material from the surface by fine polishing the surface with a suspension containing colloidal silica and a caustic substance, wherein the caustic substance has a higher pH value than the pH value of colloidal silica.

18 Claims, 3 Drawing Sheets

FIG. 5
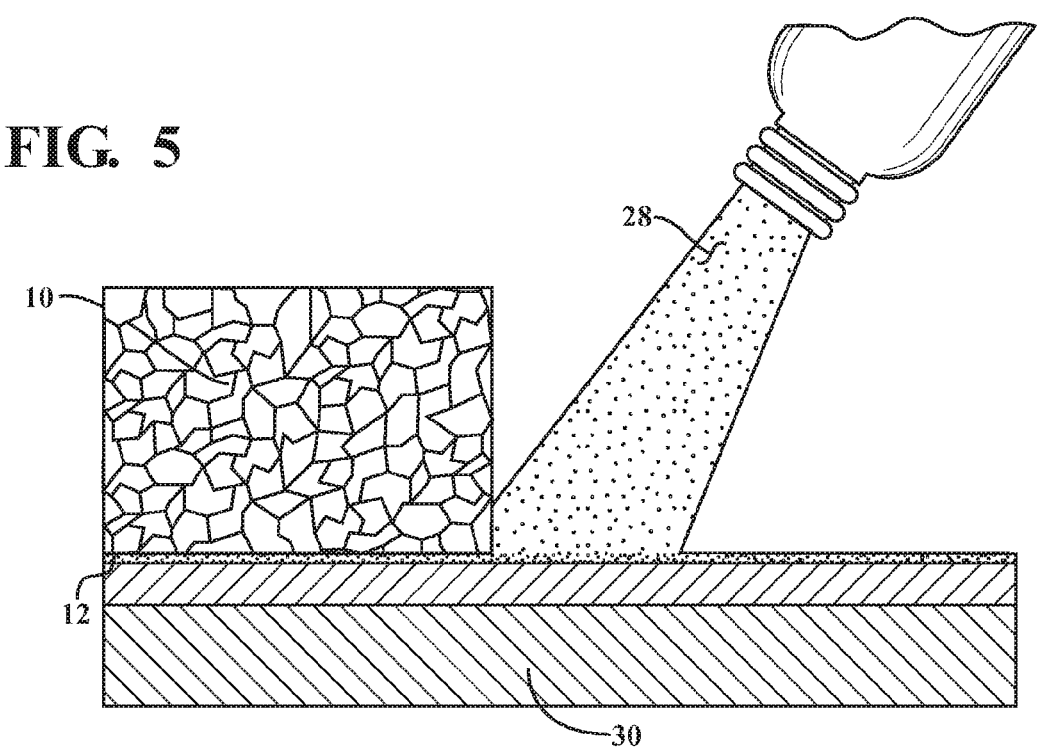
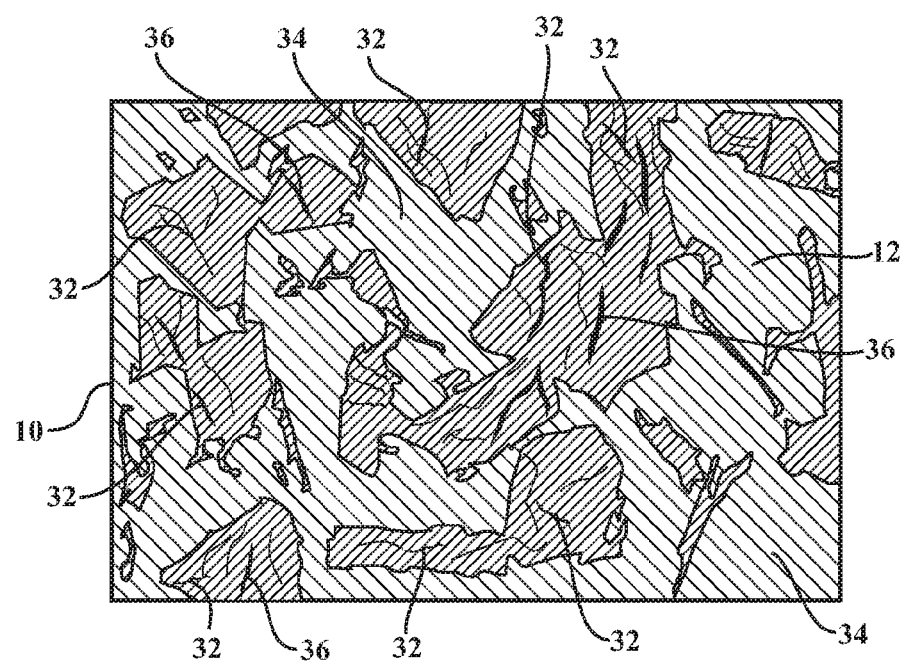
FIG. 6

CHEMICAL MECHANICAL POLISHING FOR IMPROVED CONTRAST RESOLUTION

FIELD

The present disclosure relates a mechanical and chemical polishing method for a surface of an aluminum alloy and an article created by such a method.

INTRODUCTION

Articles formed of aluminum alloys, such as alloys containing aluminum and silicon, typically undergo a multiple step polishing process to finish the surfaces of the articles. The process may include mechanical plane grinding, as well as fine grinding and polishing. Typically, after undergoing the polishing process, the surfaces of an article are then analyzed microscopically to determine the quality and reliability of the article. For example, the surfaces of the article are inspected to detect defects and cracks.

Each substep in the polishing process typically helps correct damage done by the previous substep. However, for certain alloys, such as Al—Si alloys, plastic deformation of the aluminum occurs during the polishing process, creating smearing of α-aluminum matrix particles along the surface (s) of the article. The smeared α-aluminum matrix material blends in cracks, creating little contrast within primary silicon particles and between silicon particles and aluminum, resulting in difficulty analyzing characteristics of the surface, such as cracks and defects.

SUMMARY

The present disclosure provides a metallographic chemical mechanical polishing method that enhances visual contrast resolution of alloy particles, such as primary silicon particles, and aluminum for increased accuracy of metallographic image analysis measurements of the surface of the aluminum alloy.

In one example, which may be combined with or separate from the other examples and features provided herein, a method of polishing an article comprising an aluminum alloy is provided. The method includes plane grinding a surface of the article and fine grinding the surface of the article with a plurality of first diamond chips having a first diamond chip size. The method further includes diamond polishing the surface of the article with a plurality of second diamond chips having a second diamond chip size. The second diamond chip size is smaller than the first diamond chip size. The method also includes fine polishing the surface of the article with a suspension containing colloidal silica and a caustic substance. The caustic substance has a higher pH value than the pH value of colloidal silica.

In another example, which may be combined with or separate from the other examples and features provided herein, a method of polishing an article comprising an aluminum alloy is provided. The method includes grinding a surface of the article and diamond polishing the surface of the article. The method also includes removing α-aluminum matrix material from the surface by fine polishing the surface with a suspension containing colloidal silica and a caustic substance. The caustic substance has a higher pH value than the pH value of colloidal silica.

Additional features may be provided, including but not limited to the following: the caustic substance being present in the colloidal silica suspension in an amount of about 0.5 weight percent to about 3 weight percent; the caustic substance comprising potassium hydroxide and/or sodium hydroxide; the caustic substance being present in the suspension in an amount of about 2 weight percent; the method further comprising providing the first plurality of diamond chips in a first diamond suspension lubricant and providing the second plurality of diamond chips in a second diamond suspension lubricant; the first diamond chip size being about 9 μm and the second diamond chip size being about 3 μm; the step of plane grinding being performed with an abrasive having a grit in the range of about 200 to about 500 grit; the method further comprising performing the step of plane grinding for about 2 minutes, performing the step of fine grinding for about 4 minutes, performing the step of diamond polishing for about 4 minutes, and performing the step of fine polishing for about 1 minute; the method further comprising analyzing the surface to identify contrast between aluminum and silicon particles and within silicon particles; and the step of grinding including performing a substep of plane grinding the surface of the article and subsequently performing a substep of fine grinding the surface of the article with diamond particles.

An article comprising an aluminum-silicon alloy is provided that is formed by any of the variations of the method disclosed herein.

BRIEF DESCRIPTION OF THE DRAWINGS

The drawings are provided for illustration purposes only and are not intended to limit this disclosure or the claims appended hereto.

FIG. 5 is a schematic side view of the article of FIGS. 1, 3, and 4 undergoing a fine polishing process, in accordance with the principles of the present disclosure; and FIG. 6 is a microscopic plan view of the article of FIGS. 1 and 3-5 after having undergone each step of the method shown in FIG. 2, according to the principles of the present disclosure.

DETAILED DESCRIPTION

Methods of polishing an article formed of an aluminum alloy are provided herein, as well as articles created from the disclosed methods. The methods include steps of mechanical and chemical preparation to prepare the article for microscopic analyzing and examination.

Figure 1:
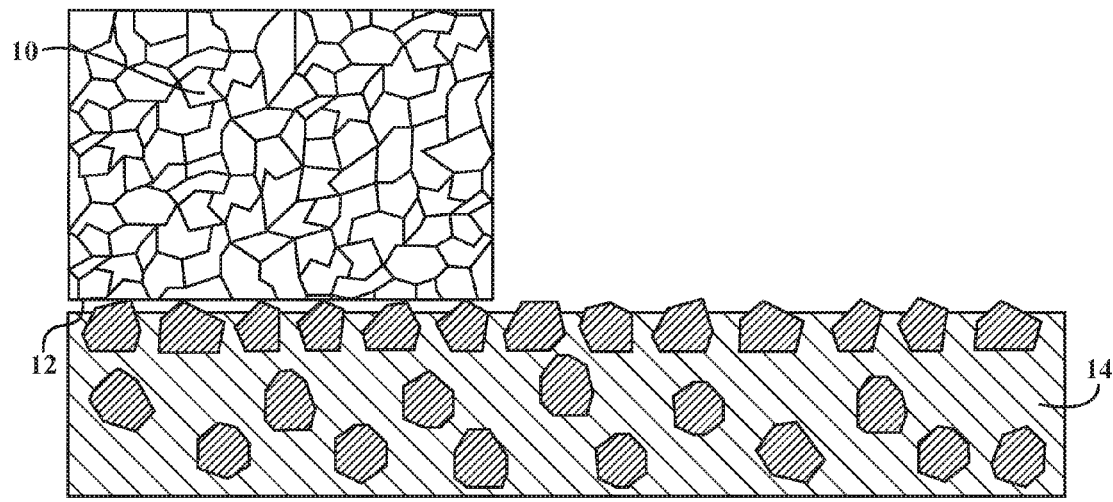
FIG. 1 is a schematic side view of an article formed of an aluminum alloy undergoing a plane grinding process, in accordance with the principles of the present disclosure.

Referring to FIG. 1, an article 10 may be cast initially into a desired shape. The article 10 may be formed of an aluminum-silicon alloy, such as B390 Al—Si, by way of example. In other examples, the article 10 may be an aluminum alloy containing at least one of the castability and strength enhancement elements such as silicon, copper, magnesium, manganese, iron, zinc, and nickel.

Figure 2:
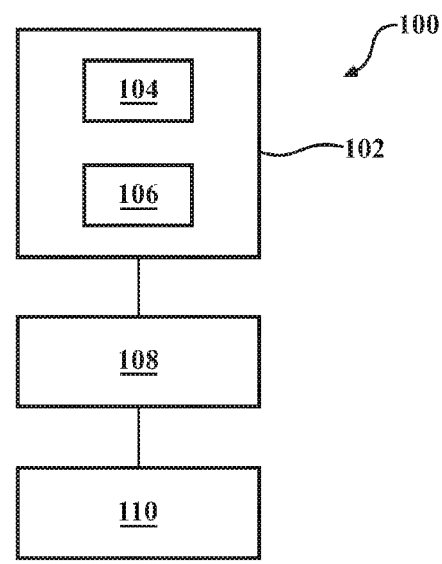
FIG. 2 is a block diagram illustrating a method of polishing an article comprising an aluminum alloy, according to the principles of the present disclosure.

Referring to FIG. 2, a method 100 is provided for polishing the article 10. The method includes one or more steps 102 of grinding the article to mechanically remove material from a surface 12 of the article 10 in order to give the surface 12 a generally uniform surface finish, at least as is visible without a microscope.

The grinding step 102 may include a first substep 104 of plane grinding the surface 12 of the article 10. For example, as shown in FIG. 1, the surface 12 may be plane ground using a disk 14 or other tool having a grit in the range of about 200# to about 500#. In some examples, a 220# magnetic disk is used, such as the 220 grit MD Plano Disk available from Struer's. The substep 104 of plane grinding may be performed on the surface 12 for about two minutes, by way of example. Water or another lubricant may be used to lubricate the surface 12 during the plane grinding substep 104. The disk 14 may be rotated, for example, at a speed of 300 rpm and with a force of about 25 N applied to the surface 12.

Figure 3:
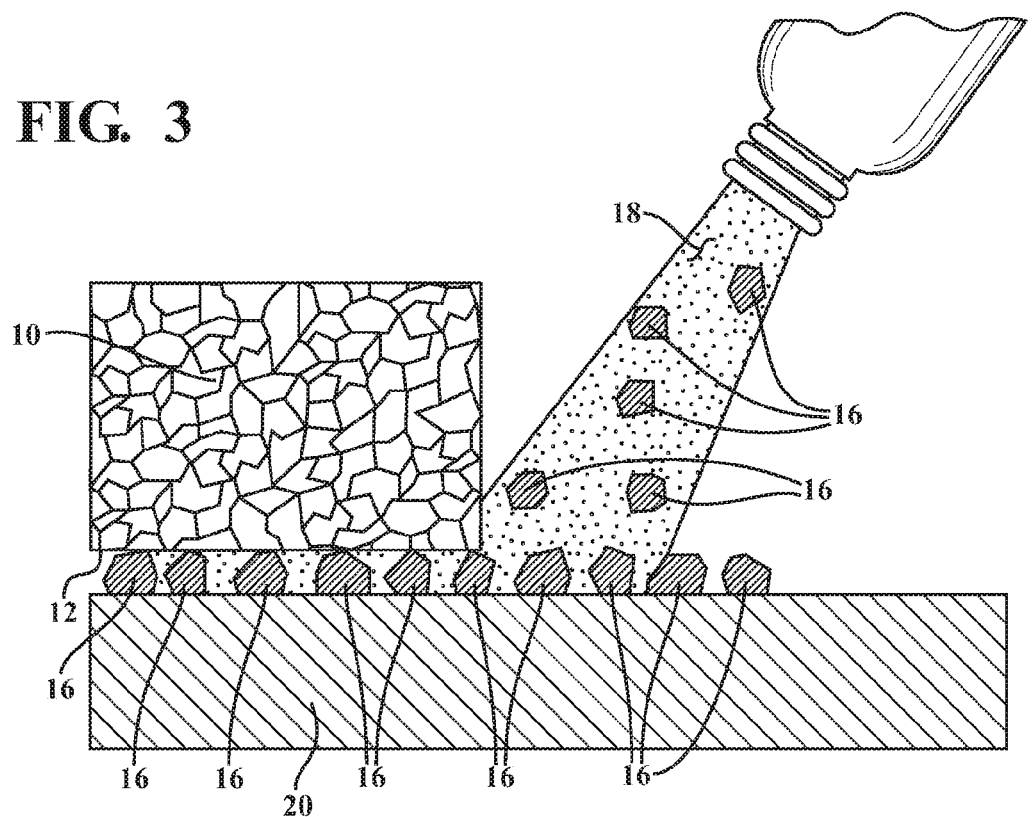
FIG. 3 is a schematic side view of the article of FIG. 1 undergoing a fine grinding process, in accordance with the principles of the present disclosure.

Referring to FIG. 3, with continued reference to FIG. 2, after the plane grinding substep 104, a fine grinding substep 106 may be performed on the surface 12 of the article 10. The fine grinding substep 106 may be used to remove damage done by the plane grinding substep 104 by using finer particles. The fine grinding substep 106 may include fine grinding the surface 12 of the article 10 with a plurality of diamond chips 16. The diamond chips 16 may be contained in a diamond suspension lubricant 18, for example, DiaPro Allegro provided by Struer's, which is continuously supplied to the surface 12 for the duration of the fine grinding substep 106. Diamond chips 16 may also be contained on a fine grinding disk 20 or tool. The diamond chips 16 could be provided in a chip size of about 9 μm, about 6 μm, or about 15 μm, by way of example. The composite disk 20 or tool may be rotated against the surface 12, the diamond chips 16, and the lubricant 18, for example, at a speed of 150 rpm and with a force of about 30 N applied to the surface 12. The substep 106 of fine grinding may be performed on the surface 12 for about four minutes, by way of example.

Figure 4:
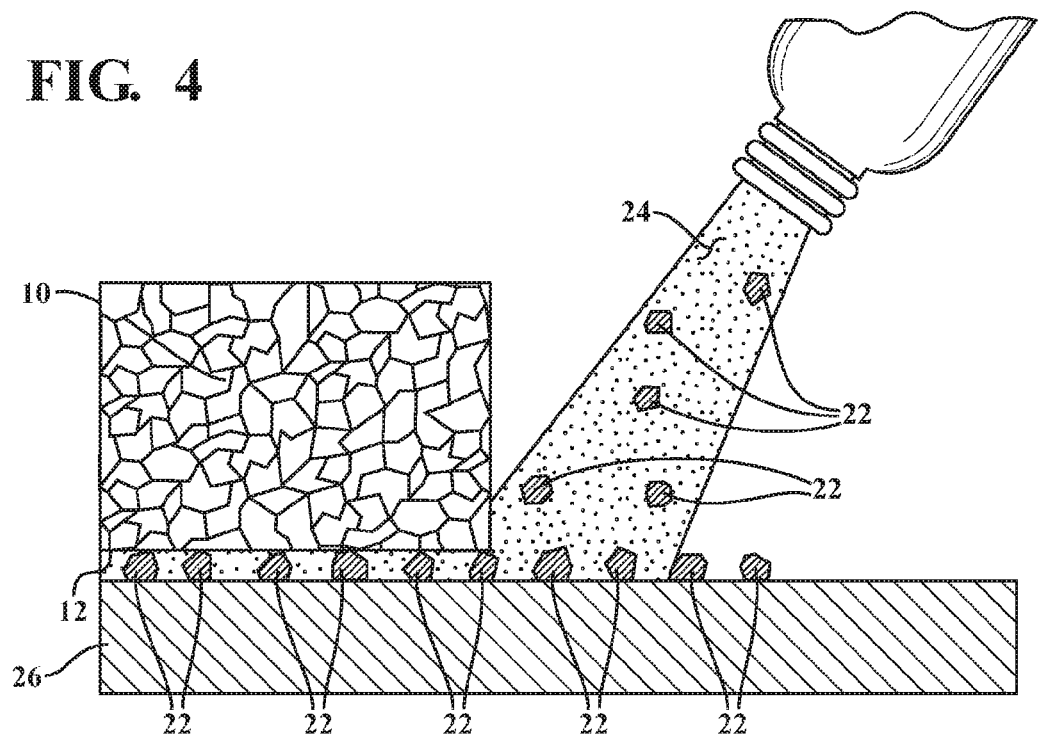
FIG. 4 is a schematic side view of the article of FIGS. 1 and 3 undergoing a diamond polishing process, according to the principles of the present disclosure.

Referring to FIG. 4, and with continued reference to FIG. 2, after the grinding step 102, the method 100 includes a diamond polishing step 108. The diamond polishing step 108 includes diamond polishing the surface 12 of the article 10 with a plurality of diamond chips 22, where the diamond chips 22 used for the diamond polishing step 108 are smaller than the diamond chips 16 used in the fine grinding substep 106. The diamond polishing step 108 may be used to remove damage done by the grinding step 102, particularly, the fine grinding substep 106, by using finer particles 22.

The diamond polishing step 108 may include polishing the surface 12 of the article 10 with the smaller diamond chips 22, which may be contained in a diamond suspension lubricant 24, for example, DiaPro Mol provided by Struer's. The diamond suspension lubricant 24 may be a water-free lubricant that is continuously supplied to the surface 12 for the duration of the diamond polishing step 108. The diamond chips 22 could be provided in a chip size of about 3 μm or about 1 μm, by way of example. A disk 26 or tool may be rotated against the surface 12, the diamond chips 22, and the lubricant 24, for example, at a speed of 150 rpm and with a force of about 25 N applied to the surface 12. The step 108 of diamond polishing may be performed on the surface 12 for about four minutes, by way of example.

Referring to FIG. 5, and with continued reference to FIG. 2, after the diamond polishing step 108, the method 100 includes a fine polishing step 110. The fine polishing step 110 includes fine polishing the surface 12 of the article 10 with a suspension 28 containing colloidal silica and a caustic substance. The fine polishing step 110 may be used to remove damage done by the previous step 108.

The fine polishing step 110 may include polishing the surface 12 of the article 10 with the suspension 28 containing colloidal silica and the caustic substance, which may be continuously supplied to the surface 12 for the duration of the fine polishing step 110. The colloidal silica could be provided in a grain size of about 0.04 μm, by way of example. A disk 30 or tool may be rotated against the surface 12 and the suspension 28, for example, at a speed of 150 rpm and with a force of about 15 N applied to the surface 12. The step 110 of fine polishing may be performed on the surface 12 for about one minute, by way of example.

The suspension 28 may be prepared by starting with a colloidal silica suspension, such as OP-U NonDry or OPS available from Struer's, and adding a caustic substance that has a higher pH value than the pH value of colloidal silica. The caustic substance may be or contain, for example, potassium hydroxide (KOH), sodium hydroxide (NaOH), lime, or any other desired caustic substance. The caustic substance may be present in the suspension 28 in an amount of about 0.5 weight percent to about 3 weight percent, about 1 weight percent to about 3 weight percent, or about 2 weight percent, by way of example.

Typically, during one or more of the grinding and polishing steps 102, 108, α-aluminum matrix material is created through plastic deformation and spread along the surface 12. The fine polishing step 110 using the suspension 28 containing the caustic substance results in the substantial removal of the α-aluminum matrix material from the surface 12.

Referring to FIG. 6, the surface 12 of the article 10 is illustrated after having undergone the fine polishing step 110. Most α-aluminum matrix material has been removed from the surface 12, due to the addition of the caustic substance to the colloidal silica suspension during the fine polishing step 110, resulting in sharp contrast between the primary silicon particles 32 and the aluminum 34, and within the silicon particles 32 themselves. Cracks 36 or other defects in the silicon 32 or aluminum 34 are visible (under microscope) because they are no longer covered and filled in by α-aluminum matrix material.

The method 100 may also include analyzing the surface 12 of the article 10 to identify contrast between the silicon particles 32 and the aluminum 34, and within the silicon particles 32. For example, an automated metallographic image analysis may be performed on the surface 12 of the article 10 to identify cracks 36, fractures, or other defects, particularly in the silicon particles 32.

Thus, the article 10 comprising an aluminum-silicon alloy is formed by the method 100 described herein, which has a surface 12 containing little or no plastic deformation caused by the process 100 in the form of α-aluminum matrix material located on the surface 12 of the article 10.

The detailed description and the drawings or figures are supportive and descriptive of the many aspects of the present disclosure. While certain aspects have been described in detail, various alternative aspects exist for practicing the invention as defined in the appended claims. It is further understood that any of the above described concepts can be used alone or in combination with any or all of the other above described concepts. Although examples have been disclosed, a worker of ordinary skill in this art would recognize that certain modifications would come within the scope of this disclosure. For that reason, the following claims should be studied to determine the true scope and content of this disclosure.

What is claimed is:

1. A method of polishing an article comprising an aluminum alloy, the method comprising:
   plane grinding a surface of the article;
   fine grinding the surface of the article with a plurality of first diamond chips having a first diamond chip size;
   diamond polishing the surface of the article with a plurality of second diamond chips having a second diamond chip size, the second diamond chip size being smaller than the first diamond chip size; and
   fine polishing the surface of the article with a suspension containing colloidal silica and a caustic substance, the caustic substance having a higher pH value than the pH value of colloidal silica.

2. The method of claim 1, wherein the caustic substance is present in the suspension in an amount of about 0.5 weight percent to about 3 weight percent.

3. The method of claim 2, wherein the caustic substance comprises at least one of potassium hydroxide and sodium hydroxide.

4. The method of claim 2, wherein the caustic substance comprises potassium hydroxide.

5. The method of claim 4, wherein the caustic substance is present in the suspension in an amount of about 2 weight percent.

6. The method of claim 5, further comprising providing the first plurality of diamond chips in a first diamond suspension lubricant and providing the second plurality of diamond chips in a second diamond suspension lubricant.

7. The method of claim 6, wherein the first diamond chip size is about 9 μm and the second diamond chip size is about 3 μm.

8. The method of claim 7, wherein the step of plane grinding is performed with an abrasive having a grit in the range of about 200 to about 500 grit.

9. The method of claim 8, further comprising performing the step of plane grinding for about 2 minutes, performing the step of fine grinding for about 4 minutes, performing the step of diamond polishing for about 4 minutes, and performing the step of fine polishing for about 1 minute.

10. The method of claim 9, further comprising analyzing the surface to identify contrast within silicon particles and between silicon particles and aluminum.

11. A method of polishing an article comprising an aluminum alloy, the method comprising:
    grinding a surface of the article;
    diamond polishing the surface of the article; and
    removing α-aluminum matrix material from the surface by fine polishing the surface with a suspension containing colloidal silica and a caustic substance, the caustic substance having a higher pH value than the pH value of colloidal silica.

12. The method of claim 11, wherein the caustic substance is present in the suspension in an amount of about 0.5 weight percent to about 3 weight percent.

13. The method of claim 12, wherein the caustic substance comprises at least one of potassium hydroxide and sodium hydroxide.

14. The method of claim 12, wherein the caustic substance comprises potassium hydroxide.

15. The method of claim 14, wherein the caustic substance is present in the suspension in an amount of about 2 weight percent.

16. The method of claim 15, wherein the step of grinding includes performing a substep of plane grinding the surface of the article and subsequently performing a substep of fine grinding the surface of the article with diamond particles.

17. The method of claim 16, further comprising performing the substep of plane grinding for about 2 minutes, performing the substep of fine grinding for about 4 minutes, performing the step of diamond polishing for about 4 minutes, and performing the step of fine polishing for about 1 minute.

18. The method of claim 17, further comprising analyzing the surface to identify contrast within silicon particles and between silicon particles and aluminum.

\* \* \* \* \*